US012654541B2

(12) United States Patent
Delor et al.

(10) Patent No.: US 12,654,541 B2
(45) Date of Patent: Jun. 16, 2026

(54) UTILITY VEHICLE WITH ELECTRIC MOTOR AT DRIVE WHEEL

(71) Applicant: ASW, LLC, Columbia City, IN (US)

(72) Inventors: Jason Patrick Delor, Churubusco, IN (US); Gauravkumar Davda, Fort Wayne, IN (US)

(73) Assignee: ASW, LLC, Columbia City, IN (US)

( * ) Notice: Subject to any disclaimer, the term of this patent is extended or adjusted under 35 U.S.C. 154(b) by 231 days.

(21) Appl. No.: 18/457,540

(22) Filed: Aug. 29, 2023

(65) Prior Publication Data

US 2025/0074180 A1 Mar. 6, 2025

(51) Int. Cl.
| | |
|---|---|
| B60K 7/00 | (2006.01) |
| B60B 27/00 | (2006.01) |
| B60G 3/20 | (2006.01) |
| B60G 7/00 | (2006.01) |
| B62D 65/02 | (2006.01) |
| H02K 1/12 | (2006.01) |

(Continued)

(52) U.S. Cl.
CPC ........ B60K 7/0007 (2013.01); B60B 27/0015 (2013.01); B60B 27/0047 (2013.01); B60G 3/20 (2013.01); B60G 7/001 (2013.01); B62D 65/02 (2013.01); H02K 1/12 (2013.01); H02K 5/04 (2013.01); B60B 2900/111 (2013.01); B60B 2900/115 (2013.01); B60B 2900/121 (2013.01); B60B 2900/131 (2013.01); B60B 2900/212 (2013.01); B60G 2200/14 (2013.01); B60K 2007/0038 (2013.01); B60K 2007/0092 (2013.01); B60T 1/065 (2013.01)

(58) Field of Classification Search
CPC .......... B60K 7/0007; B60K 2007/0038; B60K 2007/0092; B60B 27/0015; B60B 27/0047; B60B 2900/111; B60B 2900/115; B60B 2900/121; B60B 2900/131; B60B 2900/212; B60G 3/20; B60G 7/001; B60G 2200/14; B60G 2200/144; B60G 2204/182; B60G 2300/07; B60G 2300/50; B60T 1/065; B62D 65/02; H02K 1/12; H02K 5/04
See application file for complete search history.

(56) References Cited

U.S. PATENT DOCUMENTS

| | | | | |
|---|---|---|---|---|
| 4,362,221 A | 12/1982 | Manning | | |
| 4,913,258 A | * 4/1990 | Sakurai | .................. | B60K 17/30 |
| | | | | 180/242 |
| 9,090,154 B2 | 7/2015 | Marro et al. | | |

(Continued)

FOREIGN PATENT DOCUMENTS

EP 3 539 812 A1 9/2019

*Primary Examiner* — Timothy Hannon
(74) *Attorney, Agent, or Firm* — TAYLOR & EDELSTEIN, PC

(57) ABSTRACT

A utility vehicle configured for traveling off-road includes: a chassis; and a drive wheel assembly coupled with the chassis and including: a drive wheel assembly rotatable portion configured for rotating and thereby for enabling the utility vehicle to traverse a ground; a hub carrier coupled with the drive wheel assembly rotatable portion, which is configured for rotating relative to the hub carrier; and an electric motor configured for causing the drive wheel assembly rotatable portion to rotate, the electric motor including a stator which is fixedly coupled with the hub carrier.

15 Claims, 4 Drawing Sheets

(51) Int. Cl.
    *H02K 5/04*           (2006.01)
    *B60T 1/06*          (2006.01)

(56) References Cited

U.S. PATENT DOCUMENTS

| | | | |
|---|---|---|---|
| 11,498,561 B1 | 11/2022 | Madhani et al. | |
| 2008/0023237 A1* | 1/2008 | Houle | H02K 7/006 |
| | | | 903/902 |
| 2019/0248225 A1* | 8/2019 | Kawamura | B60K 7/00 |
| 2021/0070163 A1* | 3/2021 | Yada | H02K 7/102 |
| 2025/0023429 A1* | 1/2025 | Aso | B60K 7/0007 |

* cited by examiner

PROVIDING THAT THE UTILITY VEHICLE INCLUDES A CHASSIS AND A DRIVE WHEEL ASSEMBLY

COUPLING A HUB CARRIER WITH A DRIVE WHEEL ASSEMBLY ROTATABLE PORTION

COUPLING FIXEDLY A STATOR OF AN ELECTRIC MOTOR WITH THE HUB CARRIER

461

462

463

460

UTILITY VEHICLE WITH ELECTRIC MOTOR AT DRIVE WHEEL

BACKGROUND OF THE INVENTION

1. Field of the Invention

The present invention relates to utility vehicles, and, more particularly, to electrically driven utility vehicles.

2. Description of the Related Art

Utility vehicles are typically known by their acronym "UTV" and can also be referred to as utility task vehicles, utility terrain vehicles, utility task/terrain vehicles, or utility all-terrain vehicles. UTVs are off-road vehicles and are often referred to as side-by-sides, meaning that the UTV includes two seats positioned laterally—side-by-side—relative to one another. UTV's may be limited to two seats positioned side-by-side relative to one another, or alternatively may include one or more additional groups of side-by-side seats positioned in front of or behind the first group of side-by-side seats. UTVs also typically have a steering wheel, foot controls for acceleration and braking, and four to six wheels, and may have a roll cage about the side-by-side seats. By contrast, all-terrain vehicles-known by their acronym "ATV"—typically have a single seat that with a straddle configuration (like with motorcycles), handlebars, and hand controls for the motor.

Aside from UTVs, the use of electric wheel hub motors to propel vehicles is not a new idea. Some of the very first vehicles were electrically powered using motors placed at the wheel hubs for propulsion. Utilizing electric wheel hub motors for a vehicle offers many benefits, including reduced number of vehicle parts, high propulsion torque, quiet operation, and more space in the body of the vehicle for energy storage (i.e., batteries). Despite all these benefits, wheel hub motors are seldom used in on- or off-road applications due to their high weight and resulting negative performance impacts to ride, handling, and steering. As technology has advanced over the last 120 years, advances in wheel hub motor design still have not overcome these negative impacts due to faster increasing customer expectations, especially on-road vehicles.

What is needed in the art is a UTV that includes an electric motor positioned at a drive wheel assembly of the UTV.

SUMMARY OF THE INVENTION

The present invention provides a UTV that includes an electric motor positioned at a drive wheel of the UTV, the electric motor including a stator which is fixedly coupled with a hub carrier of the drivel wheel assembly.

The invention in one form is directed to a utility vehicle configured for traveling off-road, the utility vehicle including: a chassis; and a drive wheel assembly coupled with the chassis and including: a drive wheel assembly rotatable portion configured for rotating and thereby for enabling the utility vehicle to traverse a ground; a hub carrier coupled with the drive wheel assembly rotatable portion, which is configured for rotating relative to the hub carrier; and an electric motor configured for causing the drive wheel assembly rotatable portion to rotate, the electric motor including a stator which is fixedly coupled with the hub carrier.

The invention in another form is directed to a drive wheel assembly of a utility vehicle configured for traveling off-road, the utility vehicle including a chassis, the drive wheel assembly being coupled with the chassis, the drive wheel assembly including: a drive wheel assembly rotatable portion configured for rotating and thereby for enabling the utility vehicle to traverse a ground; a hub carrier coupled with the drive wheel assembly rotatable portion, which is configured for rotating relative to the hub carrier; and an electric motor configured for causing the drive wheel assembly rotatable portion to rotate, the electric motor including a stator which is fixedly coupled with the hub carrier.

The invention in yet another form is directed to a method of using a utility vehicle configured for traveling off-road, the method including the steps of: providing that the utility vehicle includes a chassis and a drive wheel assembly coupled with the chassis, the drive wheel assembly including a drive wheel assembly rotatable portion configured for rotating and thereby for enabling the utility vehicle to traverse a ground; coupling a hub carrier with the drive wheel assembly rotatable portion, which is configured for rotating relative to the hub carrier; and coupling fixedly a stator of an electric motor with the hub carrier, the electric motor being configured for causing the drive wheel assembly rotatable portion to rotate.

An advantage of the present invention is that it provides an electric wheel hub motor integrated compensating suspension system for a UTV, which overcomes most negative performance impacts.

Advantages of the present invention further include: minimizing gyroscopic oversteer of a cantilevered motor mass when steering; reducing high vibrations into the steering wheel; reducing suspension weight, resulting in improved ride and handling; reducing dynamic steering efforts, for example, due to less cantilevered motor weight; reducing part complexity; and minimizing damage to a motor controller from water and mud.

BRIEF DESCRIPTION OF THE DRAWINGS

The above-mentioned and other features and advantages of this invention, and the manner of attaining them, will become more apparent and the invention will be better understood by reference to the following description of embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
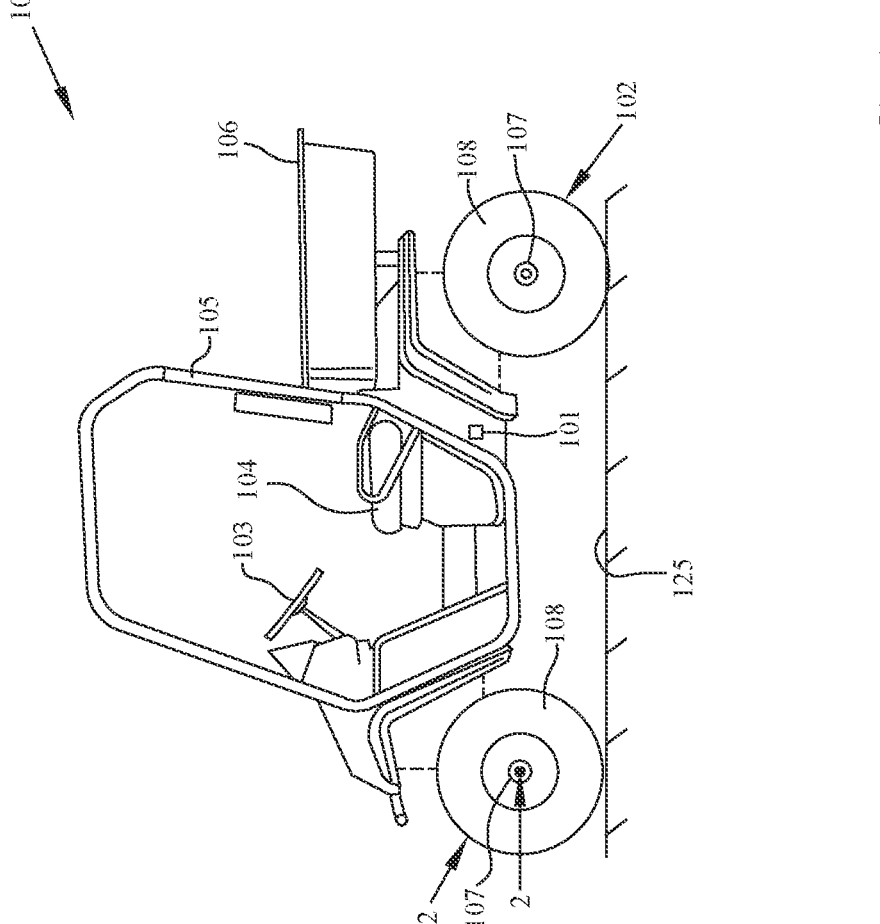
FIG. 1 illustrates schematically a side view of a utility vehicle (UTV), which includes a chassis and a drive wheel assembly, in accordance with an exemplary embodiment of the present invention.

Referring now to the drawings, and more particularly to FIG. 1, there is shown a utility vehicle (UTV) 100, which is configured for traveling on a ground 125 and, more specifically, for traveling off-road. UTV 100 generally includes a chassis 101 (shown schematically) and at least one drive wheel assembly 102 coupled with chassis 101. Chassis 101, which can also be referred to as frame 101, supports, for example, a body of UTV 100 and is sprung weight, that is, supported by springs 215 of a suspension system 209 of UTV 100. Supported by chassis 101 are other structures of UTV 100, including: a steering wheel 103; side-by-side seats 104; a roll cage 105; and a bed 106. Though not visible in FIG. 1, UTV 100 includes foot controls for braking and acceleration. UTV 100 shown in FIG. 1 is merely one example of a UTV, and the present invention is not limited to this specific design of a UTV. Further, UTV 100 can include a four-wheel drive system, which entails four drive wheel assemblies 102 respectively located at the four corners of UTV 100. Each of the four drive wheel assemblies 102 is substantially similar to one another (making adjustments for the specific corner at which the respective drive wheel assembly 102 is located), and thus only one such drive wheel assembly 102—namely, the left-front drive wheel assembly 102—is discussed below. Drive wheel assembly 102 is unsprung weight (not carried by springs 215 (FIG. 2) of suspension system 209 (FIG. 2) of UTV 100) (in FIG. 1, drive wheel assemblies 102 are shown coupled with chassis 101 schematically by way of broken lines). Drive wheel assembly 102, among other structures, includes a hub assembly 107 and a tire 108 (which is an off-road tire) coupled with hub assembly 107.

Figure 2:
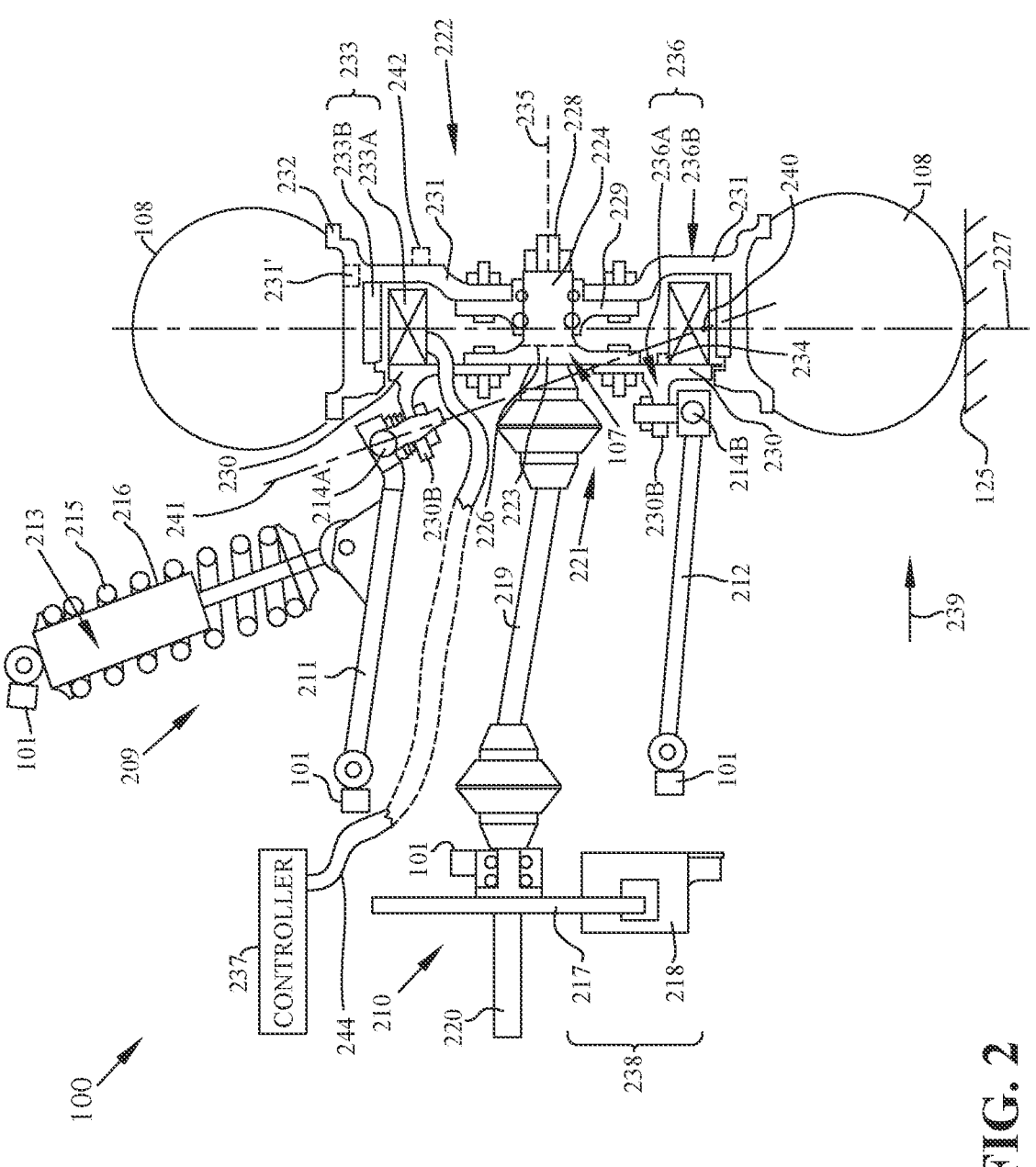
FIG. 2 illustrates schematically a front cross-sectional view of a left-front portion of the UTV of FIG. 1, with portions broken away, taken along line 2 in FIG. 1 (line 2 being shown as a point and extending perpendicularly into the page of FIG. 1), in accordance with an exemplary embodiment of the present invention.

Referring now to FIG. 2, there is shown schematically a front cross-sectional view of a left-front portion of UTV 100, with portions broken away, taken along line 2 in FIG. 1 (line 2 being shown as a point and extending perpendicularly into the page of FIG. 1). UTV 100 is shown to include chassis 101 (shown schematically as a plurality of squares, to indicate that the structures to which the squares touch are directly or indirectly connected with chassis 101), drive wheel assembly 102, suspension system 209, and a braking system 210.

Drive wheel assembly 102 includes a vertical midline 227 and further includes a drive wheel assembly nonrotatable portion 221 and a drive wheel assembly rotatable portion 222. Drive wheel assembly nonrotatable portion 221 is nonrotational in the sense that portion 221 does not rotate in the same direction as and thus with tire 108, for instance, when UTV 100 is traveling across ground 125. Drive wheel assembly rotatable portion 222 is configured for rotating and thereby for enabling UTV 100 to traverse ground 125.

Drive wheel assembly nonrotatable portion 221 includes a portion (hub 223) of hub assembly 107 and hub carrier 230 (which can also be referred to as knuckle 230). Hub assembly 107 includes a hub 223, a hub bearing 224 (which can also be referred to as wheel bearing 224) coupled with hub 223, and a hub flange 229. That hub 223 and hub bearing 224 are distinct structures (yet forming a single assembly 107) is schematically shown by a broken vertical line 226 in hub assembly 107. Hub 223 is nonrotational, and, thus, in that sense, is included in drive wheel assembly nonrotatable portion 221, whereas hub bearing 224 is rotational, and, thus, in that sense, is included in drive wheel assembly rotatable portion 222. Hub bearing 224 is rotatably coupled with hub 223. Hub 223, according to an optional configuration, includes a through-hole (extending at least generally perpendicular relative to midline 227) in which a portion of hub bearing 224 extends, wherein a bearing connection of any suitable type couples together hub 223 and hub bearing 224 where this portion of hub bearing 224 extends in this through-hole of hub 223, this bearing connection enabling hub bearing 224 to rotate relative to hub 223. Hub bearing 224 also includes a hole (which can be a through-hole and which can extend at least generally perpendicular relative to midline 227) which receives a spindle 228 of drive wheel assembly 102 therein. Spindle 228 is coupled with shaft 219, such that the driven rotation of spindle 228 causes shaft 219 to rotate, and the braking of shaft 219 by braking system 210 causes spindle 228 to slow down in rotation of spindle 228. Hub bearing 224 and spindle 228 have a splined connection to one another (that is, a slide—in spline interface), such that hub bearing 224 and spindle 228 are fixed together and thus rotate together. Hub flange 229 is attached to hub bearing 224, such as by way of suitable fasteners (alternatively, hub flange 229 can be formed integral with hub bearing 224). Hub flange 229 thus seats on hub bearing 224.

Knuckle 230, according to one embodiment of the present invention, is attached to hub assembly 107 (more specifically, to hub 223) and to structures of a steering system of vehicle 100 in order that a user of vehicle 100 might use steering wheel 103 to steer drive wheel assembly 102 (knuckle 230 can also be deemed to be a part of the steering system and thus can be referred to as steering knuckle 230). Knuckle 230 is located in an inboard region (to the left of midline 227 in FIG. 2) of drive wheel assembly 102. Knuckle 230 includes an upper arm 230A and a lower arm 230B which are coupled respectively with control arms 211, 212 of suspension system 209. Knuckle 230 is made of any suitable material and in any suitable manner. Knuckle 230 can be connected to hub 223 in any suitable manner, such as by way of fasteners (for example, bolts and nuts), as indicated in FIG. 2. Knuckle 230 is a structure of drive wheel assembly 102 relative to which drive wheel assembly rotatable portion 222 is configured for rotating. Further, knuckle 230 is coupled with drive wheel assembly rotatable portion 222 by way of hub 223, hub bearing 224, and hub flange 229.

Drive wheel assembly rotatable portion 222, according to an embodiment of the present invention, includes hub bearing 224, hub flange 229, wheel 231, and tires 108. Wheel 231 can be formed of any suitable material and in any suitable manner. Wheel 231 is connected to (and thus mounts to) hub flange 229 in any suitable manner, such as by way of fasteners (for example, bolts and nuts), as indicated in FIG. 2. Further, wheel 231 includes rims 232 which connects tires 108 to wheel 231.

Drive wheel assembly 102 further includes an electric motor 233 configured for causing drive wheel assembly rotatable portion 222 to rotate (each drive wheel assembly 102 can include electric motor 233). Electric motor 233 (which can be referred to as a wheel hub electric motor) includes a stator 233A (which can be referred to as a wheel hub stator) and a rotor 233B (which can be referred to as a wheel hub rotor), wherein it can be understood that stator 233A is a part of drive wheel assembly nonrotatable portion 221, and rotor 233B is a part of drive wheel assembly rotatable portion 222. Motor 233 can receive electrical power by way of any suitable power source, such as one or more batteries carried by vehicle 100, fuel cell(s) carried by vehicle 100, or solar panel(s) carried by vehicle 100. Motor 233 can be operably connected to any such power source in any suitable manner. Motor 233 can be any type of suitable electric motor and can employ direct current (DC) or alternating current (AC); herein, it is assumed that motor 233 employs AC. Further, though not discussed further herein, vehicle 100 can include any suitable devices necessary to employ motor 233, such as conductors, converters, inverters, etc.

Stator 233A is fixedly (nonrotationally) coupled with knuckle 230, and thus stator 233A is a part of drive wheel assembly nonrotatable portion 221. Stator 233A is at least partially positioned laterally outboard relative to knuckle 230. FIG. 1 shows stator 233A to be positioned entirely laterally outboard relative to knuckle 230.

Stator 233A can be coupled with knuckle 230 in any suitable manner. For instance, stator 233A may be directly attached to knuckle 230, as shown in FIG. 2. According to an alternative embodiment of the present invention, an intervening structure 234 (shown schematically in FIG. 2 by a box formed by broken lines) of drive wheel assembly nonrotatable portion 221 may serve to couple stator 233A and knuckle 230 together. That is, knuckle 230 may remain substantially as schematically shown in FIG. 2 or may be separated into two parts-knuckle 230 (which can be provided with a reduced size or otherwise with a different shape relative to what is shown in FIG. 2 as knuckle 230, according to this alternative embodiment) and intervening structure 234; either way, knuckle 230 can be attached to hub 223 and intervening structure 234 (wherein knuckle 230 and intervening structure 234 can be attached to one another in any suitable manner, such as by way of fasteners, such as bolts and nuts), and intervening structure 234 can be attached to knuckle 230 and stator 233A. Intervening structure 234 may be so positioned as to form an inner motor housing 236A (in addition to or in the alternative to knuckle 230) or at least a portion thereof.

Rotor 233B is caused to rotate by stator 233A, according to known electrical principles. According to an embodiment of the present invention, rotor 233B, as is shown in FIG. 2, is positioned radially outwardly of stator 233A. Further, as is shown in FIG. 2 and according to an embodiment of the present invention, rotor 233B is attached to wheel 231 in any suitable manner, rotor 233B being positioned radially inwardly of tire 108. Rotor 233B, as with stator 233A as well, can be substantially bisected by midline 227, as indicated in FIG. 2. In this way, during operation, stator 233A causes rotor 233B to rotate, which causes wheel 231 and tire 108 to rotate about axis of rotation 235, thereby causing forward or rearward motion of vehicle 100. Further, as explained below, the rotation of wheel 231 about axis of rotation 235 causes hub flange 229 to rotate about axis 235, which causes hub bearing 224 to rotate about axis 235, which causes spindle 228 to rotate about axis 235, which causes shaft 219 to rotate, which causes shaft 220 to rotate, which causes brake rotor 217 to rotate as well.

Drive wheel assembly 102 further includes a motor housing 236 configured for housing electric motor 233 at least substantially (i.e., stator 233A and rotor 233B) therein. According to one embodiment of the present invention, motor housing 236 includes knuckle 230 (alternatively, intervening structure 234 in addition to, or in the alternative to, knuckle 230) and wheel 231 (though it can also be understood that hub assembly 107 also in part further encloses and thus houses electric motor 233). Thus, it can be appreciated that motor housing 236 includes a motor housing nonrotatable portion 236A (which is a part of drive wheel assembly nonrotatable portion 221) and a motor housing rotatable portion 236B (which is a part of drive wheel assembly rotatable portion 222). Motor housing nonrotatable portion 236A is coupled with stator 233A and includes knuckle 230 (and may optionally be formed entirely by knuckle 230) or is coupled with knuckle 230 (in this latter alternative, it can be understood that intervening structure 234 is included in motor housing nonrotatable portion 236A). As a result, motor housing nonrotatable portion 236A (which can also be referred to as the inner motor housing) is positioned at least substantially laterally inboard of motor housing rotatable portion 236B (which can also be referred to as the outer motor housing). Motor housing rotatable portion 236B is coupled with rotor 233B, which is thereby configured for causing the drive wheel assembly rotatable portion 222—and thus also motor housing rotatable portion 236B—to rotate. Further, motor housing rotatable portion 236B includes wheel 231. Motor housing nonrotatable portion 236A is an inner motor housing in that motor housing nonrotatable portion 236A is positioned at least substantially to the left of midline 227, and motor housing rotatable portion 236B is an outer motor housing in that motor housing rotatable portion 236B is positioned at least substantially to the right of midline 227.

Vehicle 100 further includes a wheel hub motor controller 237. Controller 237 is placed inboard of suspension system 209, more specifically, inboard of control arms 211, 212. This placement of controller 237 advantageously (a) minimizes damage to controller 237 from environmental conditions, such as mud and water, and (b) reduces suspension weight (that is, the weight of suspension system 209), which results in improved ride and handling of vehicle 100. Controller 237 can be coupled with and carried by chassis 101. Controller is configured for controlling the performance of electrical motor 233 (i.e., the turning on or off of motor 233, the speed of rotor 233B, the acceleration or deceleration of rotor 233B). In order to effect this control, controller 237 can be operably coupled (by way of coupling 244) with motor 233, such as with stator 233A of motor 233; this coupling can be accomplished in any suitable manner, such as through hardwiring by way of electrical conductors, or wirelessly.

Further, in general, controller 237 may correspond to any suitable processor-based device(s), such as a computing device or any combination of computing devices. Controller 237 may generally include one or more processor(s) and associated memory configured to perform a variety of computer-implemented functions (e.g., performing the methods, steps, algorithms, calculations and the like disclosed herein). Thus, controller 237 may include a processor therein, as well as associated memory, data, and instructions, each forming at least part of controller 237. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory may generally be configured to store information accessible to the processor(s), including data that can be retrieved, manipulated, created, and/or stored by the processor(s) and the instructions that can be executed by the processor(s). In some embodiments, data may be stored in one or more databases.

Suspension system 209 includes an upper control arm 211, lower control arm 212 (which can also be referred to as a lower control arm assembly 212, which includes lower control arm linkages 212), and a spring and damper assembly 213. Upper control arm 211 can have any suitable configuration, including a single control arm or a plurality of control arms, and can be made in any suitable manner and of any suitable material. Upper control arm 211 is coupled with upper arm 230A of knuckle 230 by way of at least one upper ball joint 214A of suspension system 209. The lower control arm 212 of suspension system 209 is formed by not a single arm but by two lower control arm linkages 212 (the two linkages 212 are more visible in FIG. 3). Lower control arm linkages 212 can be made in any suitable manner and of any suitable material. Lower control arm linkages 212—which include a first control arm linkage 212 and a second control arm linkage 212—are coupled with lower arm 230B of knuckle 230 by way of two respective lower ball joints 214B of suspension system 209. Upper control arm 211 and lower control arm linkages 212 are directly or indirectly connected with chassis 101. Spring and damper assembly 213 can be formed according to any suitable configuration, such as a strut or a coilover spring and damper assembly 213 as shown (according to an alternative embodiment, a spring and damper can be located separately from another in the suspension system). Spring and damper assembly 213 includes a damper 216 and a spring 215 coiled about damper 216. The function of spring and damper assembly 213 is well known, with spring 215 serving to absorb forces of chassis and the weight carried thereby, and damper 216 serving to dampen the oscillations of spring 215. The present invention provides that suspension system 209 can include at least one of a number of different types of suspensions (such as front suspensions), including, but not necessarily limited to, strut suspensions, double wishbone suspensions, or short-long arm suspensions, as well as multi-link suspensions.

Figure 3:
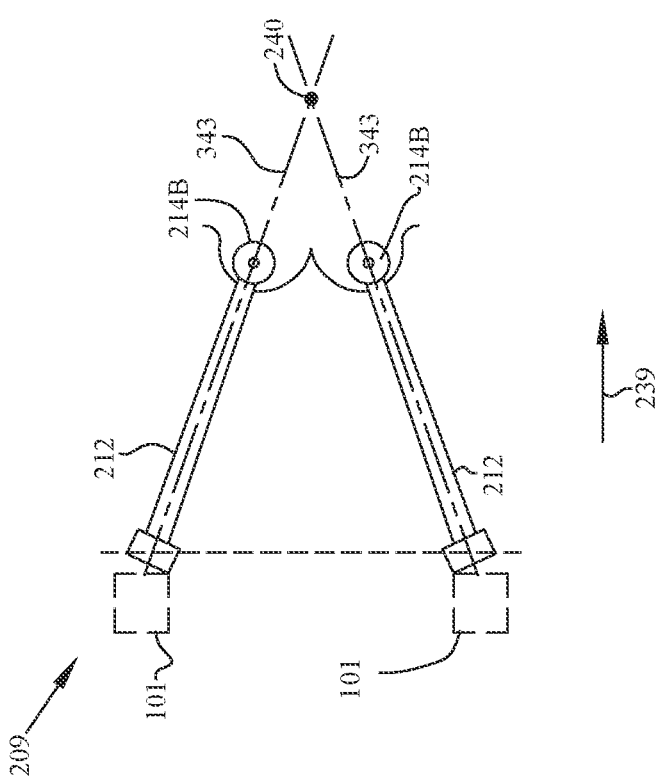
FIG. 3 illustrates schematically a top view of the left-front portion of the UTV of FIG. 2, with portions broken away, in accordance with an exemplary embodiment of the present invention.
Figure 4:
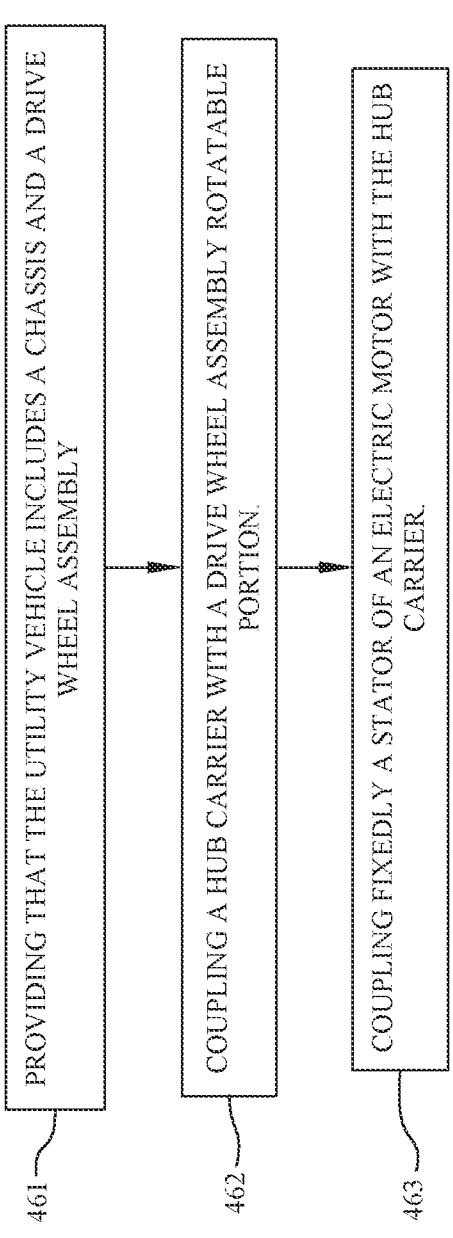
FIG. 4 illustrates a flow diagram showing a method of using the utility vehicle, in accordance with an exemplary embodiment of the present invention.

When viewed from overhead (see FIG. 3), first and second control arm linkages 212 converge toward one another in a direction 239 toward knuckle 230. This convergence forms a virtual pivot point 240 within motor housing 236 (FIG. 3). Virtual pivot point 240 in part is that through which a steering axis 241 (which can also be referred to as kingpin axis 241) of suspension system 209 extends. Steering axis 241 extends through a pivot point defined by upper ball joint 214A and also through virtual pivot point 240, as shown in FIG. 2.

Braking system 210 includes a brake assembly 238 which includes a brake rotor 217 and brake caliper 218 for grasping brake rotor 217. Braking system 210 further includes a rotatable shaft 219 (which can be referred to as halfshaft 219) and rotatable shaft 220. Shaft 219 is rotationally coupled with spindle 228 of drive wheel assembly 102, wherein spindle 228 extends into and is connected to hub bearing 224 of hub assembly 107 by way a slide—in spline interface, hub bearing 224 causing spindle 228 to rotate. Shaft 219 is, in turn, rotationally coupled with shaft 220, such that shaft 219 causes shaft 220 to rotate. Shaft 220 is connected to brake rotor 217 (such as by way of a slide—in spline interface), shaft 220 causing brake rotor 217 to rotate. Shaft 219 can optionally be understood to include spindle 228 and shaft 200. Once installed, shaft 219 cannot fall out once assembled and captured between these mounted components (i.e., spindle 228 and shaft 220). Brake assembly 238—namely, brake rotor 217 and brake caliper 218—are placed inboard of suspension system 209, more specifically, at least substantially inboard of control arms 211, 212, and thus of lower control arm assembly 212. Such positioning advantageously reduces suspension weight (that is, the weight of suspension system 209), which results in improved ride and handling of vehicle 100.

According to an embodiment of the present invention shown in FIG. 2, knuckle 230 forms in whole or in part (and is thus integrated into) inner motor housing 236A. Advantageously, this formation: reduces suspension weight, resulting in improved ride and handling; minimizes gyroscopic oversteer of a cantilevered motor mass when steering; and reduces dynamic steering efforts, for example, due to less cantilevered motor weight.

Further, according to an embodiment of the present invention, stator 233A is connected to or otherwise coupled with (and this connection/coupling can render stator 233A to be integrated with) knuckle 230 (or knuckle 230 and/or intervening structure 234, according to alternative embodiments) and inner motor housing 236A. Advantageously, this connection/coupling: reduces suspension weight, resulting in improved ride and handling; minimizes gyroscopic oversteer of a cantilevered motor mass when steering; reduces dynamic steering efforts, for example, due to less cantilevered motor weight; and reduces part complexity.

Further, according to an embodiment of the present invention shown in FIG. 2, wheel 231 is deemed to be the entirety of motor housing rotatable portion 236B (also known as outer motor housing 236B), such that wheel 231 is integrated with outer motor housing 236B. Advantageously, this integration: reduces suspension weight, resulting in improved ride and handling; minimizes gyroscopic oversteer of a cantilevered motor mass when steering; reduces dynamic steering efforts, for example, due to less cantilevered motor weight; and reduces part complexity.

According to an alternative of the present invention indicated in FIG. 2, motor housing rotatable portion 236B includes wheel 231' (which is shown schematically as a box of broken lines in FIG. 2) and outer motor housing 242 (which is shown schematically as a box of broken lines in FIG. 2), wheel 231' and outer motor housing 242 thus being distinct structures rather than the same structure as with wheel 231. The broken line box 231' within wheel 231 indicates that wheel 231' can be (though not necessarily) structured differently and/or functions at least partly differently than wheel 230. Outer motor housing 242 can be positioned in any suitable position—whether inboard or outboard, or a mixture thereof, of wheel 231'—so as to house at least outboard portions of motor 233. Wheel 231' and outer motor housing 242 can be attached to one another in any suitable manner, such as by way of fasteners, such as bolts and nuts.

Referring now to FIG. 3, there is shown a top view of the left-front portion of the UTV of FIG. 2, with portions broken away. The front of vehicle 100 is toward the bottom of the page of FIG. 3. FIG. 3 shows a portion of suspension system 209, including first and second control arm linkages 212. The first control arm linkage 212 is the front control arm linkage 212 (bottom-most in the page of FIG. 3); thus, the second control arm linkage 212 is the rear control arm linkage 212 (top-most in the page of FIG. 3). Linkages 212 are coupled with chassis 101 (shown schematically) at their inboard ends and with lower arms 230B of knuckle 230 by way of ball joints 214B at their outboard ends. As can be readily seen in FIG. 3, first and second control arm linkages 212 converge toward one another in direction 239 (though not shown in FIG. 3, knuckle 230 would be to the right of linkages 212 in the page of FIG. 3). By extending longitudinal axes 343 of linkages 212, this convergence of linkages 212 in direction 239 causes longitudinal axes 343 to converge toward one another and eventually to cross one another at virtual pivot point 240, which is located outboard relative to linkages 212, as can be seen in FIG. 3. In this way, vehicle 100 includes a four-bar linkage including chassis 101, two linkages 212 (instead of a single lower control arm), and knuckle 230 by way of ball joints 214A. As indicated above, this arrangement places virtual pivot point 240 of steering axis 241 "virtually" within motor housing 236, or, optionally, even more specifically, into motor 233. Advantageously, this arrangement: minimizes gyroscopic oversteer of a cantilevered motor mass when steering; reduces dynamic steering efforts, for example, due to less cantilevered motor weight; and reduces high vibrations into steering wheel 103.

In use, vehicle 100 may be operated and driven employing electrical motor 233 of drive wheel assembly 102 by way of controller 237. Stator 233A electromagnetically stimulates rotor 233B to produce rotation of rotor 233B, thereby moving vehicle 100 across ground 125. Advantageously, electrical motor 233 is located outboard relative to knuckle 230 and radially outward and along midline 227 of hub assembly 107.

Referring now to FIG. 3, there is shown a flow diagram showing a method 460 of using utility vehicle 100, which is configured for traveling off-road. Method 460 includes the steps of: providing 461 that the utility vehicle 100 includes a chassis 101 and a drive wheel assembly 102 coupled with the chassis 101, the drive wheel assembly 102 including a drive wheel assembly rotatable portion 222 configured for rotating and thereby for enabling the utility vehicle 100 to traverse a ground 125; coupling 462 a hub carrier 230 with the drive wheel assembly rotatable portion 222, which is configured for rotating relative to the hub carrier 230; and coupling 463 fixedly a stator 233A of an electric motor 233 with the hub carrier 230, the electric motor 233 being configured for causing the drive wheel assembly rotatable portion 222 to rotate. Stator 233A can be at least partially positioned laterally outboard relative to the hub carrier 230. Electric motor 233 can include a rotor 233B which is positioned radially outward of the stator 233A. Drive wheel assembly 102 can include a motor housing 236 configured for housing the electric motor 233 at least substantially therein, the motor housing 236 including a motor housing nonrotatable portion 236A and a motor housing rotatable portion 236B, the rotor 233B being coupled with the motor housing rotatable portion 236B and thereby being config-ured for causing the drive wheel assembly rotatable portion 222—as well as the motor housing rotatable portion 236B which partially forms the drive wheel assembly rotatable portion 222—to rotate. Motor housing nonrotatable portion 236A can include or be coupled with the hub carrier 230 such that the motor housing nonrotatable portion 236A is positioned at least substantially laterally inboard of the motor housing rotatable portion 236B. Utility vehicle 100 can further include a suspension system 209 including a lower control arm assembly 212 including a first control arm linkage 212 and a second control arm linkage 212 each of which is coupled with the chassis 101 and the hub carrier 230, the first control arm linkage 212 and the second control arm linkage 212 converging toward one another in a direc-tion 239 toward the hub carrier 230, the utility vehicle 100 further including a brake assembly 238 which is positioned at least substantially inboard of the lower control arm assembly 212.

It is to be understood that the steps of method 460 are performed by controller 237 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 237 described herein, such as the method 460, is implemented in software code or instructions which are tangibly stored on a tangible com-puter readable medium. The controller 237 loads the soft-ware code or instructions via a direct interface with the computer readable medium or via a wired and/or wireless network. Upon loading and executing such software code or instructions by controller 237, controller 237 may perform any of the functionality of controller 237 described herein, including any steps of the method 460.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a comput-er's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this inven-tion pertains and which fall within the limits of the appended claims.

What is claimed is:

1. A utility vehicle configured for traveling off-road, the utility vehicle comprising:
   a chassis;
   a drive wheel assembly coupled with the chassis and including:
      a drive wheel assembly rotatable portion configured for rotating and thereby for enabling the utility vehicle to traverse a ground;
      a hub carrier coupled with the drive wheel assembly rotatable portion, which is configured for rotating relative to the hub carrier; and
      an electric motor configured for causing the drive wheel assembly rotatable portion to rotate, the elec-tric motor including a stator which is fixedly coupled with the hub carrier;
   a suspension system including a lower control arm assem-bly including a first control arm linkage and a second control arm linkage each of which is coupled with the chassis and the hub carrier, the first control arm linkage and the second control arm linkage converging toward one another in a direction toward the hub carrier; and
   a brake assembly which is positioned at least substantially inboard of the lower control arm assembly.

2. The utility vehicle according to claim 1, wherein the stator is at least partially positioned laterally outboard rela-tive to the hub carrier.

3. The utility vehicle according to claim 2, wherein the electric motor includes a rotor which is positioned radially outward of the stator.

4. The utility vehicle according to claim 3, wherein the drive wheel assembly includes a motor housing configured for housing the electric motor at least substantially therein, the motor housing including a motor housing nonrotatable portion and a motor housing rotatable portion, the rotor being coupled with the motor housing rotatable portion and thereby being configured for causing the drive wheel assembly rotatable portion—as well as the motor housing rotatable portion which partially forms the drive wheel assembly rotatable portion—to rotate.

5. The utility vehicle according to claim 4, wherein the motor housing nonrotatable portion includes or is coupled with the hub carrier such that the motor housing nonrotatable portion is positioned at least substantially laterally inboard of the motor housing rotatable portion.

6. A drive wheel assembly of a utility vehicle configured for traveling off-road, the utility vehicle including a chassis, the drive wheel assembly being coupled with the chassis, the drive wheel assembly comprising:

a drive wheel assembly rotatable portion configured for rotating and thereby for enabling the utility vehicle to traverse a ground;

a hub carrier coupled with the drive wheel assembly rotatable portion, which is configured for rotating relative to the hub carrier, the hub carrier being configured for being that, together with the chassis of the utility vehicle, to which each of a first control arm linkage and a second control arm linkage of a suspension system of the utility vehicle is coupled, wherein the first control arm linkage and the second control arm linkage converge toward one another in a direction toward the hub carrier, the utility vehicle further including a brake assembly which is positioned at least substantially inboard of the lower control arm assembly; and an electric motor configured for causing the drive wheel assembly rotatable portion to rotate, the electric motor including a stator which is fixedly coupled with the hub carrier.

7. The drive wheel assembly according to claim 6, wherein the stator is at least partially positioned laterally outboard relative to the hub carrier.

8. The drive wheel assembly according to claim 7, wherein the electric motor includes a rotor which is positioned radially outward of the stator.

9. The drive wheel assembly according to claim 8, further comprising a motor housing configured for housing the electric motor at least substantially therein, the motor housing including a motor housing nonrotatable portion and a motor housing rotatable portion, the rotor being coupled with the motor housing rotatable portion and thereby being configured for causing the drive wheel assembly rotatable portion—as well as the motor housing rotatable portion which partially forms the drive wheel assembly rotatable portion—to rotate.

10. The drive wheel assembly according to claim 9, wherein the motor housing nonrotatable portion includes or is coupled with the hub carrier such that the motor housing nonrotatable portion is positioned at least substantially laterally inboard of the motor housing rotatable portion.

11. A method of using a utility vehicle configured for traveling off-road, the method comprising the steps of:

providing that the utility vehicle includes a chassis and a drive wheel assembly coupled with the chassis, the drive wheel assembly including a drive wheel assembly rotatable portion configured for rotating and thereby for enabling the utility vehicle to traverse a ground;

coupling a hub carrier with the drive wheel assembly rotatable portion, which is configured for rotating relative to the hub carrier;

coupling fixedly a stator of an electric motor with the hub carrier, the electric motor being configured for causing the drive wheel assembly rotatable portion to rotate; and using the utility vehicle, the utility vehicle further including a suspension system including a lower control arm assembly including a first control arm linkage and a second control arm linkage each of which is coupled with the chassis and the hub carrier, the first control arm linkage and the second control arm linkage converging toward one another in a direction toward the hub carrier, the utility vehicle further including a brake assembly which is positioned at least substantially inboard of the lower control arm assembly.

12. The method according to claim 11, wherein the stator is at least partially positioned laterally outboard relative to the hub carrier.

13. The method according to claim 12, wherein the electric motor includes a rotor which is positioned radially outward of the stator.

14. The method according to claim 13, wherein the drive wheel assembly includes a motor housing configured for housing the electric motor at least substantially therein, the motor housing including a motor housing nonrotatable portion and a motor housing rotatable portion, the rotor being coupled with the motor housing rotatable portion and thereby being configured for causing the drive wheel assembly rotatable portion—as well as the motor housing rotatable portion which partially forms the drive wheel assembly rotatable portion—to rotate.

15. The method according to claim 14, wherein the motor housing nonrotatable portion includes or is coupled with the hub carrier such that the motor housing nonrotatable portion is positioned at least substantially laterally inboard of the motor housing rotatable portion.

* * * * *